(12) United States Patent
Kell et al.

(10) Patent No.: US 7,983,809 B2
(45) Date of Patent: Jul. 19, 2011

(54) AIRCRAFT INTEGRATED SUPPORT SYSTEM (ISS)

(75) Inventors: Edward T. Kell, Wallingford, CT (US); Anthony J. Lowe, Stratford, CT (US); Sebastian H. Colbert, Hartford, CT (US)

(73) Assignee: Sikorsky Aircraft Corporation, Stratford, CT (US)

( * ) Notice: Subject to any disclaimer, the term of this patent is extended or adjusted under 35 U.S.C. 154(b) by 676 days.

(21) Appl. No.: 11/962,264

(22) Filed: Dec. 21, 2007

(65) Prior Publication Data

US 2010/0042283 A1  Feb. 18, 2010

(51) Int. Cl.
*G01M 17/00* (2006.01)
(52) U.S. Cl. .............. 701/29; 701/3; 701/33; 701/36; 340/438; 340/439
(58) Field of Classification Search .............. 701/3, 29, 701/33, 35, 36; 340/425.5, 438, 439; 702/182
See application file for complete search history.

(56) References Cited

U.S. PATENT DOCUMENTS

| | | | |
|---|---|---|---|
| 4,023,409 A | 5/1977 | Durand |
| 4,300,200 A | 11/1981 | Doe |
| 4,470,116 A | 9/1984 | Ratchford |
| 4,574,360 A | 3/1986 | Bateman |
| 4,702,106 A | 10/1987 | Hassenpflug et al. |
| 4,780,838 A | 10/1988 | Adelson |
| 4,794,793 A | 1/1989 | Favre et al. |
| 4,829,441 A | 5/1989 | Mandle et al. |
| 4,893,261 A | 1/1990 | Flint, III et al. |
| 5,063,777 A | 11/1991 | Arethens et al. |
| 5,121,325 A | 6/1992 | DeJonge |
| 5,214,596 A | 5/1993 | Muller |
| 5,225,829 A | 7/1993 | Bateman |
| 5,229,956 A | 7/1993 | Daniell et al. |
| 5,239,468 A | 8/1993 | Sewersky et al. |
| 5,457,634 A | 10/1995 | Chakravarty |
| 5,475,594 A | 12/1995 | Oder et al. |
| 5,479,350 A | 12/1995 | Barakchi et al. |
| 5,552,987 A | 9/1996 | Barger et al. |
| 5,571,953 A | 11/1996 | Wu |
| 5,610,923 A | 3/1997 | Callay |
| 5,751,609 A | 5/1998 | Schaefer, Jr. et al. |

(Continued)

FOREIGN PATENT DOCUMENTS

JP  2003002298  1/2003

(Continued)

OTHER PUBLICATIONS

PCT International Search Report and Written Opinion, PCT/US2008/084453, mailed Apr. 17, 2009.

*Primary Examiner* — Gertrude Arthur Jeanglaud
(74) *Attorney, Agent, or Firm* — Carlson Gaskey & Olds PC

(57) ABSTRACT

An aircraft integrated support system (ISS) downloads Integrated Vehicle Health Management System (IVHMS) data from an aircraft, processes the downloaded data to infer a status of aircraft systems and displays maintenance information via an Interactive Electronic Technical Manual (IETM). The ISS integrates a maintenance and support environment to bind the information flow among the various aircraft and logistics networks for a fully integrated systemic approach which optimizes aircraft operation, maintenance, and support through data collection and analysis to maximize aircraft readiness.

27 Claims, 16 Drawing Sheets

U.S. PATENT DOCUMENTS

| | | | |
|---|---|---|---|
| 5,761,625 A | 6/1998 | Honcik et al. | |
| 5,838,261 A | 11/1998 | Lauta et al. | |
| 5,931,877 A | 8/1999 | Smith | |
| 5,987,397 A | 11/1999 | McCool et al. | |
| 6,009,356 A | 12/1999 | Monroe | |
| 6,246,341 B1 | 6/2001 | Germanetti | |
| 6,453,669 B2 | 9/2002 | Kennedy et al. | |
| 6,512,527 B1 | 1/2003 | Barber et al. | |
| 6,560,589 B1 | 5/2003 | Stier et al. | |
| 6,591,258 B1 | 7/2003 | Stier et al. | |
| 6,606,546 B2 | 8/2003 | Sinex | |
| 6,633,742 B1 | 10/2003 | Turner et al. | |
| 6,671,593 B2 | 12/2003 | Sinex | |
| 6,684,136 B2 | 1/2004 | Sinex | |
| 6,691,006 B2 | 2/2004 | Sinex | |
| 6,697,718 B2 | 2/2004 | LeDraoullec et al. | |
| 6,795,758 B2 | 9/2004 | Sinex | |
| 6,826,461 B2 | 11/2004 | Sinex | |
| 6,907,416 B2 | 6/2005 | Tasooji et al. | |
| 6,912,453 B2 | 6/2005 | LeDraoullec et al. | |
| 6,993,420 B2 | 1/2006 | LeDraoullec et al. | |
| 2004/0008253 A1* | 1/2004 | Monroe | 348/143 |
| 2004/0172278 A1* | 9/2004 | Bell | 705/1 |
| 2007/0124222 A1 | 5/2007 | Avery | |
| 2008/0159158 A1* | 7/2008 | Poisson et al. | 370/249 |

FOREIGN PATENT DOCUMENTS

| | | |
|---|---|---|
| KR | 20000046433 | 7/2000 |

* cited by examiner

Inventory—Microsoft Internet Explorer

| Part Id | Alternate Id | Description | Condition | Quantity On Hand |
|---|---|---|---|---|
| 442042-1 | 442042-1 | FUEL CONTROL UNIT | New | 0 |
| 92303-04800-111 | 92303-04800-111 | ESU | New | 5 |

Close

--- http://localhost:2175/servlets/wietmcv?target=main&action=test_symptom&symptom_id=T.S496100_0.1—Microsoft Internet Explorer Symptom Decription: MDC Fault group: "Power Unit Essential Shutdown -- MDC Fault Code: "004".

Component Name: Fuel Control Unit

Materials Required

| Specification No./Part No. | Nomenclature | Qty |
|---|---|---|
| NAS847 | Protective Caps and Plugs | AR |

Support Equipment Required

| Part No./Type Designation | Nomenclature |
|---|---|
| Commercially Available | Torque Wrench (10-50in. lbs) |

| INDEX NO. | PART NUMBER | ..DESCRIPTION | UNITS PER ASSY | SM&R CODE |
|---|---|---|---|---|
| | NONPROCURABLE | FUEL CONTROL INSTALLATION | RF | RF |
| 1 | 442042-1 | •FUEL CONTROL ASSEMBLY | 1 | PAODD |
| 10 | M83248-1 | •PACKING | 2 | PAOZZ |
| 20 | 234-511-9059 | •COUPLING | 1 | PAOZZ |
| 30 | | | | |

Component Name: Wire path

Component Name: Wire path

Component Name: Wire path

FIG.8

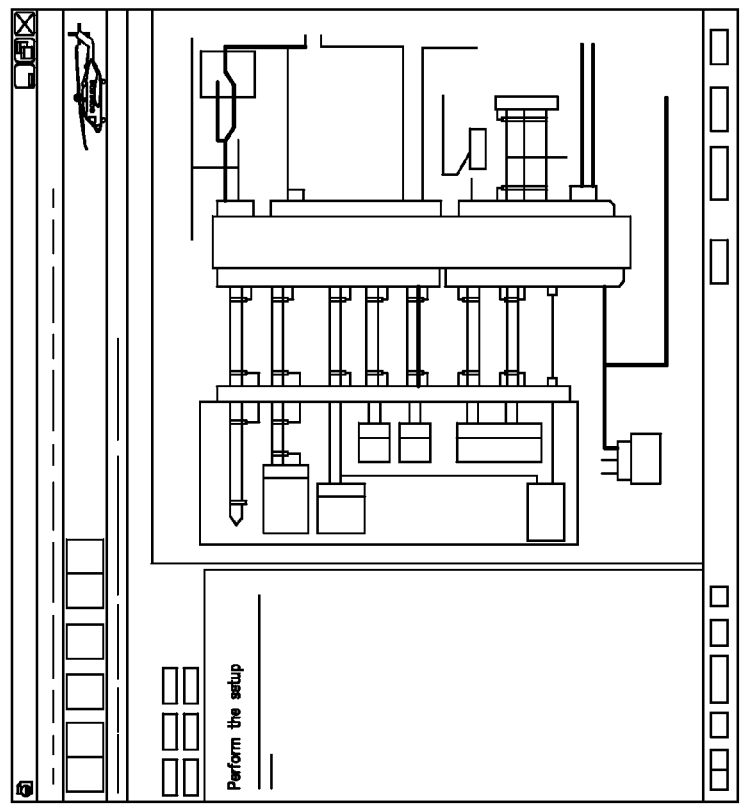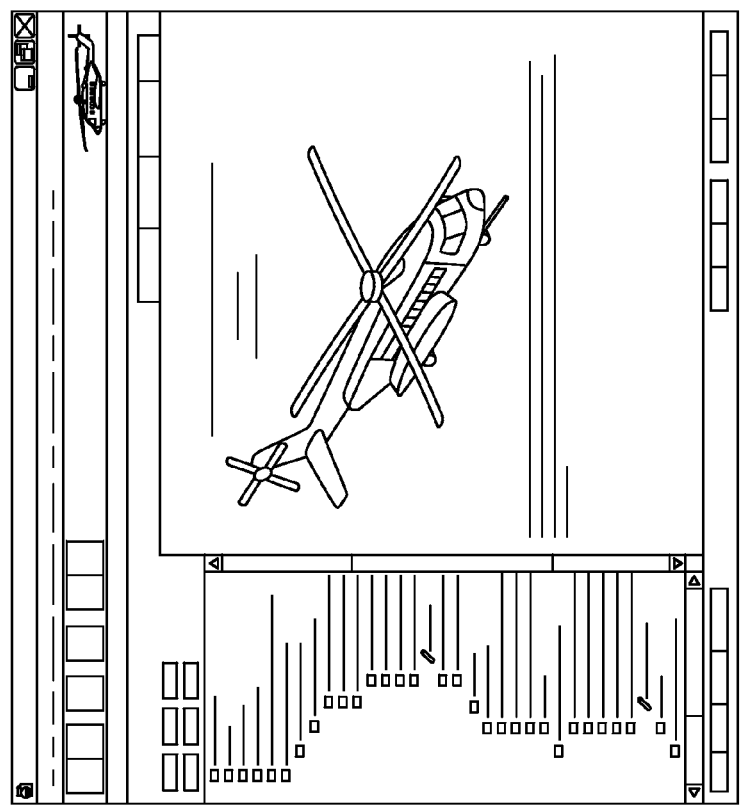
FIG.10

FIG.13

AIRCRAFT INTEGRATED SUPPORT SYSTEM (ISS)

BACKGROUND OF THE INVENTION

The present invention relates to an aircraft fleet management service and more particularly to an aircraft integrated support system (ISS) which integrates the maintenance and support environment to bind the information flow among various aircraft and logistics networks to optimize aircraft operation, maintenance, and support.

Various management services are available to increase aircraft availability and operator profitability. The air-worthiness of a vast number of aircraft and other vehicles is dependent upon many inter-dependent subsystems. Often, when any one of many critical components fails or requires repair, service is disrupted because the entire aircraft or several major systems must be removed from service. Service disruption results in delays, cancellations and significant cost for operators. Traditionally, service disruptions are prevented or reduced by large parts inventories and by preemptive replacement of systems, subsystems and component parts. These remedies may be sub-optimum because inventories consume capital, risk obsolescence, and because premature maintenance and component replacement under-utilizes assets.

Accordingly, it is desirable to provide a fleet management service which integrates maintenance and support environments to maximize aircraft readiness.

SUMMARY OF THE INVENTION

An aircraft integrated support system (ISS) according to an exemplary embodiment of the present invention for Aircraft Fleet Management include at least one customer network in communication with a top level network and at least one deployed detachment network in communication with the customer network to communicate maintenance data between an aircraft and the top level network through the at least one customer network. The Integrated Support System (ISS) in an exemplary embodiment is implemented through computer readable software which interconnects deployed aircraft detachment networks, aircraft fleet operator customer networks and an aircraft original equipment manufacturer (OEM) top level network such as Sikorsky Aircraft Corporation (SAC), through a communication system.

A computer-implemented Integrated Support System according to another exemplary embodiment of the present invention includes downloading data from an aircraft, processing the downloaded data to infer a status of at least one aircraft systems, and displaying maintenance information relative to the status via an Interactive Electronic Technical Manual (IETM) in response to the processing.

The present invention in certain exemplary embodiments therefore provides a fleet management service which integrates the maintenance and support environment to maximize aircraft readiness.

BRIEF DESCRIPTION OF THE DRAWINGS

The various features and advantages of this invention will become apparent to those skilled in the art from the following detailed description of the currently preferred embodiment. The drawings that accompany the detailed description can be briefly described as follows:

FIG. 8 is a screenshot of a check inventory/maintenance assets for an exemplary fuel control unit component;

FIG. 10 is a screenshot of the Interactive Electronic Technical Manual (IETM);

FIG. 13 is a screenshot of three different UID reader data screens; and

DETAILED DESCRIPTION OF THE PREFERRED EMBODIMENT

Figure 1A:
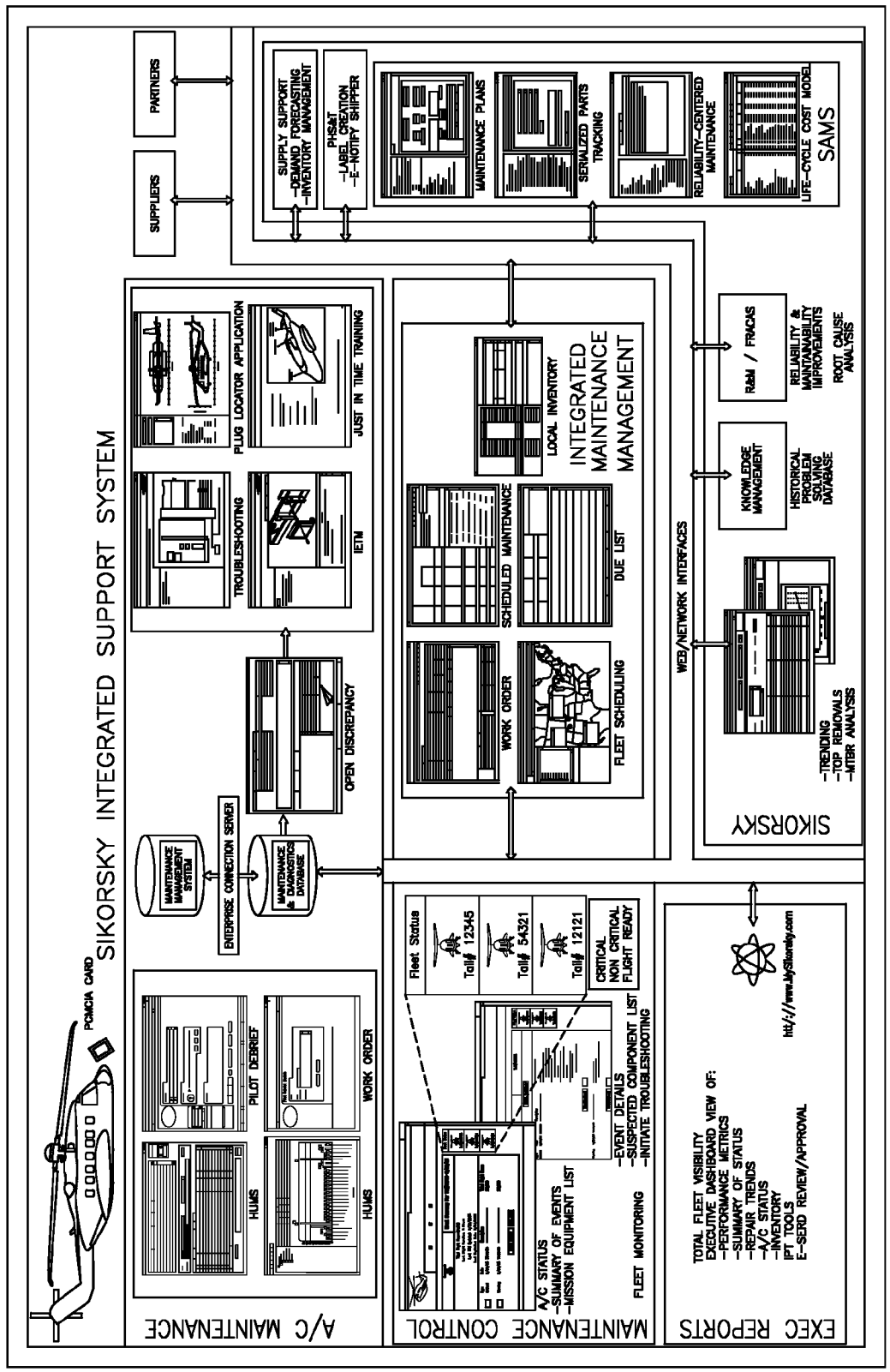
FIG. 1A is a schematic block diagram of an integrated support system (ISS) according to the present invention.
Figure 1B:
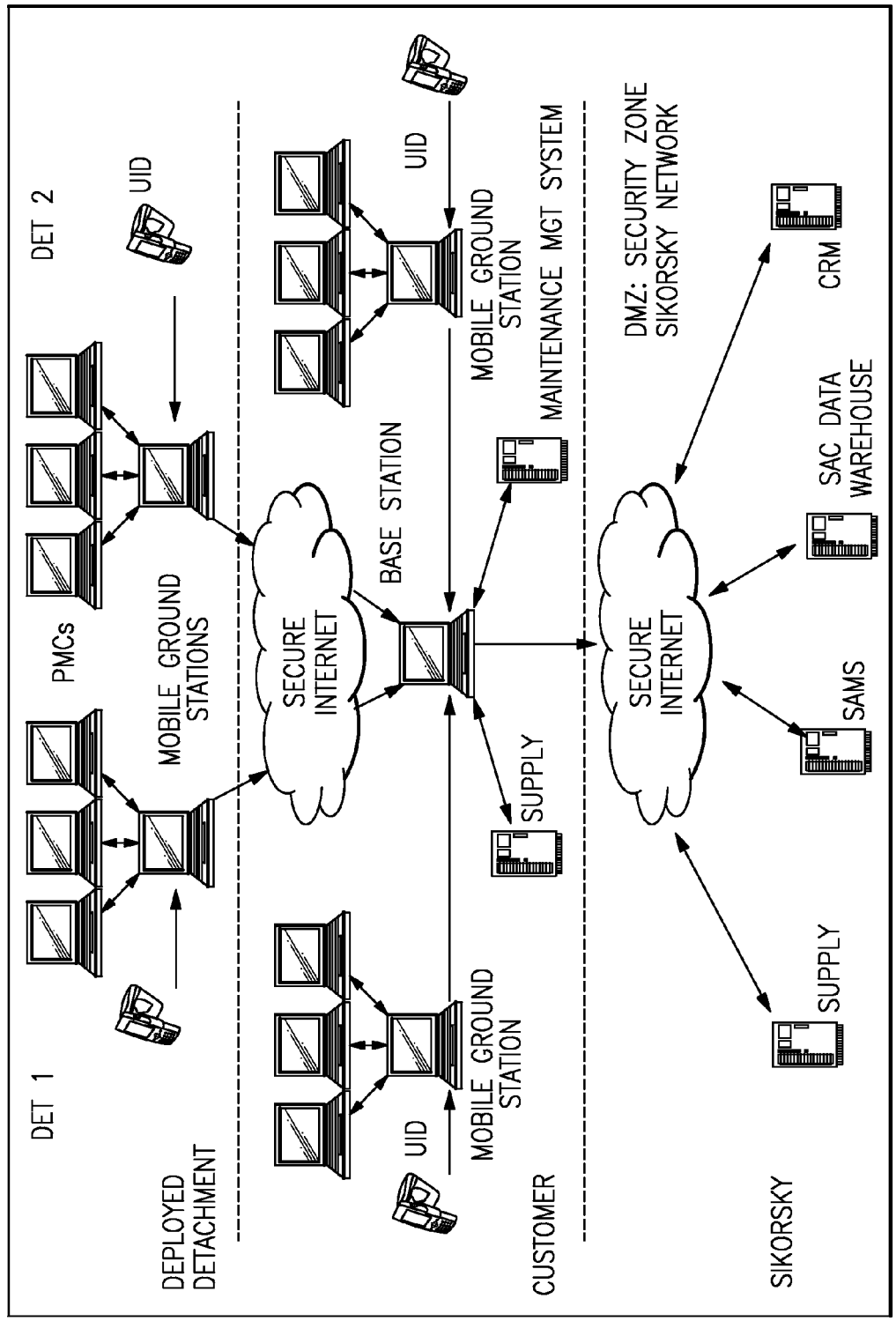
FIG. 1B is a schematic block diagram of the integrated support system (ISS) network infrastructure.

FIG. 1A schematically illustrates an Integrated Support System (ISS) in a block diagram format. The Integrated Support System (ISS) is an integrated maintenance environment designed for gathering and sharing maintenance data in near real-time over a secure network (FIG. 1B). The Integrated Support System (ISS) addresses a maintenance profile for each aircraft by employing a series of analytical software tools which augment a Fleet Management System. Independently, each of the tools described herein is a powerful source of information; together, they form a technologically potent engine of data collection and feedback for both the aircraft customer community and the logistics support infrastructure.

The Integrated Support System (ISS) is implemented through computer readable software which interconnects deployed aircraft detachment networks, aircraft fleet operator customer networks and an aircraft original equipment manufacturer (OEM) top level network such as Sikorsky Aircraft Corporation (SAC), through a communication system (FIG. 1B). It should be understood that various communication systems will be usable with the present invention and that the illustrated embodiment of network systems are for descriptive purposed only.

Figure 2A:
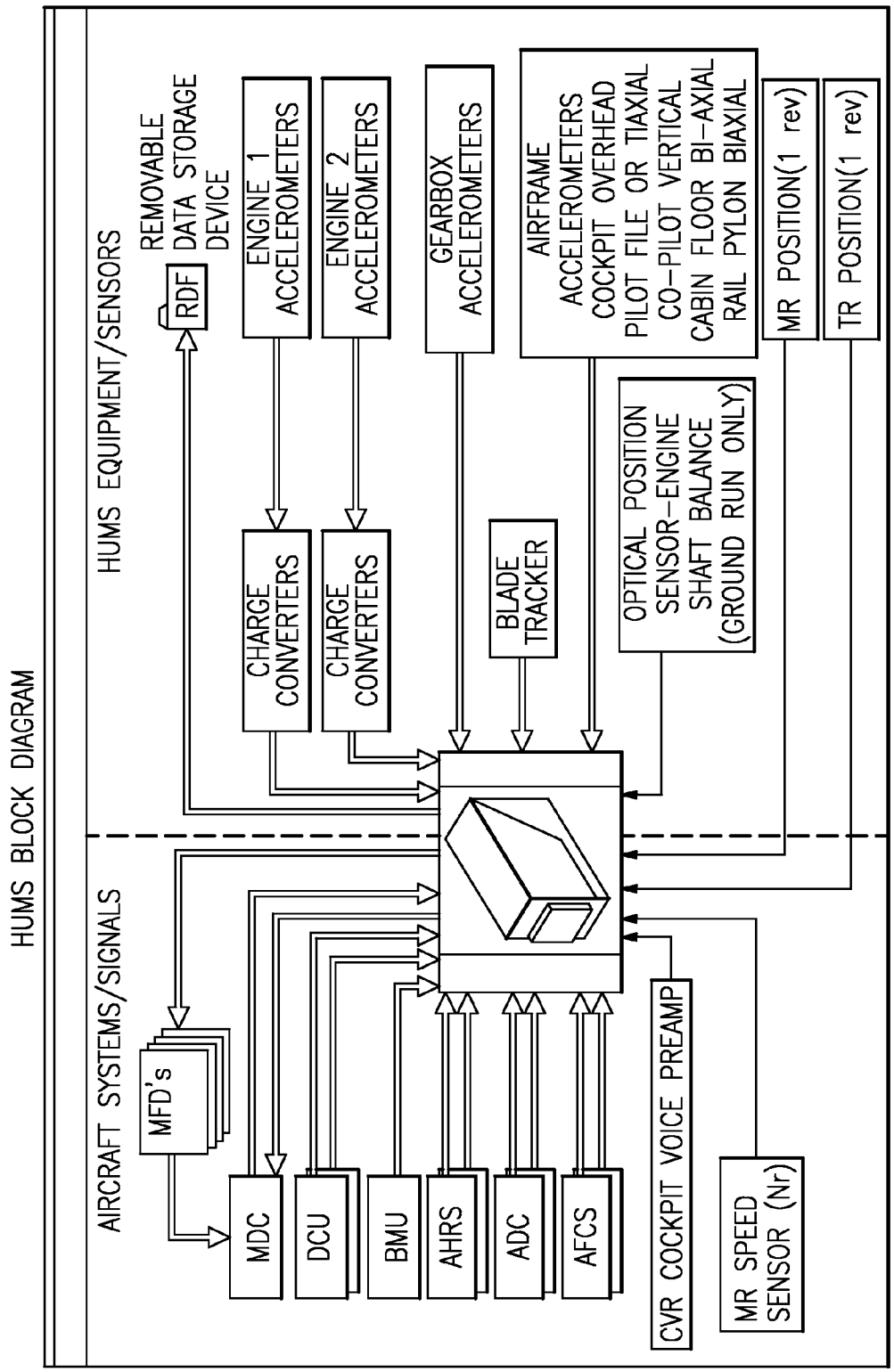
FIG. 2A is a schematic view of a HUMS Service according to the present invention.
Figure 2B:
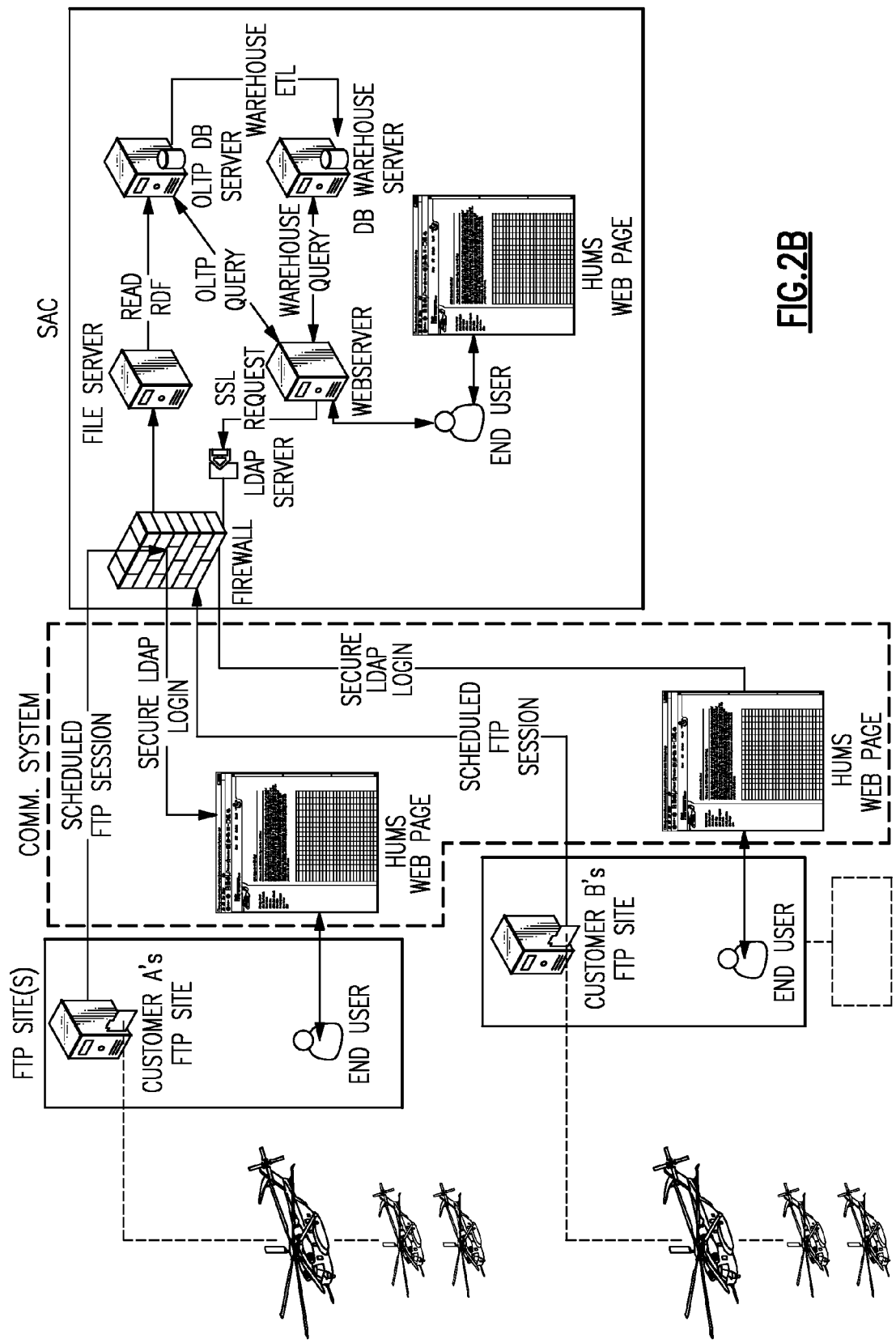
FIG. 2B is a schematic diagram which illustrates that a HUMS gathers data from various aircraft avionic subsystems as well as sensors located through out the rotorcraft.

Modem aircraft contain on-board monitoring and diagnostic capabilities that are coupled with the Integrated Support System (ISS) to facilitate communication between a ground maintenance system and the original equipment manufacturer (OEM). This capability improves each aircraft's support profile through increased mission readiness and decreased operating costs. Aircraft monitoring and diagnostic capabilities typically include Health, Usage, and Monitoring System (HUMS) data from each aircraft which is collected in, for example, an aircraft removable data storage device (such as a PCMCIA card) which communicates with a multitude of sensors, avionic subsystems, and other data collection devices on each aircraft (FIG. 2A). The HUMS data from the aircraft removable data storage device is then uploaded to a top level network typical based at the aircraft original equipment manufacturer (OEM) (one uploading scheme illustrated schematically in FIG. 2B).

The HUMS interconnects any number of operators with the top level network, however, other networks both above and below the "top" level network may alternatively or additionally be utilized. That is, the present invention is described in terms of Sikorsky Aircraft Corporation (SAC) which is an aircraft original equipment manufacturer (OEM) that provides the top level network, however, other organizations may provide the "top level network" as defined herein to provide a fully integrated systemic network approach to maximize aircraft readiness.

Subsystems of the Integrated Support System (ISS):

Base Station

A base station may be a desktop or portable computer system with sufficient memory, graphics, and wireless capability to support the desired software applications. The base station serves as the operating unit's primary data repository, provides an interface to various maintenance services, and displays fleet status. Information gathered at the base station is routed to predetermined customer and original equipment manufacturer (OEM) databases for further use. Typically there is one base station per customer site.

Mobile Ground Station (MGS)

A mobile ground station (MGS) is a field-hardened portable computer system with sufficient memory, graphics, and wireless capability to support the desired software applications. A mobile ground station (MGS) may be provided to each of several work centers or detachments for communication with the base station. The mobile ground station (MGS) serves as each work center's primary data repository, interfacing to various maintenance services and fleet status displays.

The mobile ground station (MGS) may also serve as a base station when detachments are deployed. During deployments, each mobile ground station (MGS) records maintenance actions for reconciliation with the base station. This reconciliation can occur during physical return to the base or remotely over a secure Internet connection. Additionally, Health, Usage, and Maintenance (HUMS) ground station software may be installed on each mobile ground station (MGS) to facilitate Integrated Vehicle Health Management System (IVHMS) data download and processing. Typically, there is one mobile ground station (MGS) per aircraft.

Portable Maintenance Computer (PMC)

The Portable Maintenance Computer (PMC) is a field-hardened unit with sufficient memory, graphics, and wireless capable to support the desired software applications. Maintainers use the Portable Maintenance Computer (PMC) at the aircraft while aircraft maintenance is performed. The Portable Maintenance Computer (PMC) is a maintainer's primary interface to an Interactive Electronic Technical Manual (IETM), Plug Locator Application (PLA), Web-based Training (WBT), and maintenance recordation performed at the aircraft. Recorded maintenance information can be uploaded to the mobile ground station (MGS) or a base station. Typically, there are three PMCs per aircraft.

Unique Identifier (UID) Reader

The Unique Identifier (UID) reader is a field-hardened unit with sufficient memory to support the desired software applications. The Unique Identifier (UID) reader reads different types of parts marking technologies such as 2D bar matrix or RFID tags. These various parts marking technologies contain unique part identifier information such as part numbers and serial numbers. The Unique Identifier (UID) communicates information such as the part information through a docking station which is in communication with a Portable Maintenance Computer (PMC).

The data is collected on the Unique Identifier (UID) and then communicated to a local maintenance management system (Helotrac Lite) on the Portable Maintenance Computer (PMC) for temporary storage prior to being routed to the primary maintenance management system which resides in the mobile ground station (MGS). The collected data may also include aircraft configuration. Typically, there is one Unique Identifier (UID) reader per mobile ground station (MGS).

Local Maintenance Management System (Helotrac Lite)

The local maintenance management system (Helotrac Lite), installed on each Portable Maintenance Computer (PMC), manages aircraft maintenance session data related to replaced or repaired components. Maintenance session data may include corrective action, removed part number/serial number, installed part number/serial number, malfunction code and reason code. This information is replicated to the base station and then to appropriate OEM or customer databases/entities.

Inventory/Parts Ordering

An inventory/parts ordering subsystem connects desired part information in the Integrated Support System (ISS) with a "back-end" parts supply chain. This integration allows maintainers to check inventory status, automatically populate/view/edit/delete parts orders, and track order requests. "Hotspotted" indexed item part numbers, located in the Interactive Electronic Technical Manual (IETM), which provides illustrated parts breakdown that allow maintainers to enter the desired item quantity into a "shopping cart" and check supply system inventory databases in "real-time". The shopping cart displays all selected parts and associated information required for the auto-population and submission of a requisition form to supply personnel.

Sikorsky Aircraft Maintainability System (SAMS)

The Sikorsky Aircraft Maintainability System (SAMS) relational database provides data storage and the preparation and documentation of aircraft program maintenance planning, technical publications, material support, contractor services, transportation, personnel training, support equipment, and other logistic support plans. Sikorsky Aircraft Maintainability System (SAMS) is a MIL-STD-1388 system that includes a robust aircraft and component-tracking infrastructure.

The system also integrates an illustrated parts breakdown authoring environment with the parts provisioning data. The Sikorsky Aircraft Maintainability System (SAMS) environment integrates data from Sikorsky design and manufacturing, engineering, operations and research (O&R), provisioning and maintenance databases for display in a single user interface. Sikorsky Aircraft Maintainability System (SAMS) also stores diagnostics dependency information. Folder titles display the desired level of detail. Folders in Sikorsky Aircraft Maintainability System (SAMS) may include:

Systems, Parts
Tools
Aircraft
Suppliers
Action items
Configuration items
Consumables
Labor categories
Scheduled maintenance
Support Equipment Requirements Data (SERD)

Customers
Staff
Groups
Life cycle cost analysis, reporting
Illustrated parts breakdown (IPB)
Serialized component tracking
RCM (Reliability centered Maintenance)

Network-Centric Data Collection and Routing System

The Network-Centric Data Collection and Routing system collects, formats, and routes aircraft maintenance actions and component data to disparate Information Technology (IT) systems for reporting and analysis. The target IT systems may be native to OEM and/or customer IT infrastructures. The network-centric data collection and routing system communicates with the various IT systems via their native or third party interfaces. Robust messaging and workflow functionality is provided, such as once-and-only-once data transport, messaging security, message validation, data transformation, and systems integration.

The Network-Centric Data Collection and Routing system architecture functions much like the Internet and provide robust system interoperability. Data structures are analyzed and XML schemes permit the exchange of information between the various platforms independent of the target operating system or data engine. Rules define how data messages are routed and the platform assumes all responsibility for successful message delivery. Orphaned data and messaging disruptions due to systems outages are virtually eliminated. This enables the Integrated Support System (ISS) to cope with scenarios where base stations and/or mobile ground stations (MGS) become unavailable due to regular or catastrophic events.

Maintenance Management System (MMS) Interface

An interface to customer-specified Maintenance Management System (MMS) facilitates creation of a work order after a pilot debrief session; and facilitates maintenance of aircraft and update of aircraft configuration relative thereto. That is, the Maintenance Management System (MMS) may be software tailored to each customer to provide specific features the Maintenance Management System (MMS) runs on the customer base station and/or mobile ground station (MGS).

Executive Reports

Executive reports is a business intelligence system that may be added to an OEM data warehouse to provide access to data from a number of legacy systems. This system provides Total Asset Visibility (TAV) throughout the aircraft supply chain.

Business intelligence layers provide visibility into detailed maintenance data. The business intelligence layers provide executive performance management dashboards, analytics, and ad hoc query and analysis. Based on aircraft program requirements, a number of executive performance management dashboards, analytics, and standard reports are developed to help manage the aircraft. Examples of executive dashboards include the overall health of the supply chain that provides visibility into stock levels, order trends, on-time delivery, top removals, etc.

The executive dashboards also provide the OEM and the customer with high-level summaries. These summaries may include, but are not limited to: cost, schedule, and outstanding item metrics in the form of bar charts, line graphs, and pie charts. Such summaries may be grouped together within a dashboard to provide the user with ready access to a high-level status overview of the aircraft fleet. Dashboards typically serve as an early warning system for key performance indicators such as Mission Capable (MC) rate backorders, stock-outs, and part defects (Quality Deficiencies).

Balanced Scorecards (BSC) (e.g. red, yellow, green indicators) facilitate timely proactive decisions and corrective actions before problems occur. Some of the expected reports include; performance metrics, summary of status, repair trends, A/C status, inventory, etc.

Ad hoc query and analysis capability may be used by analysts to continually evaluate maintenance and supply data. This ad hoc query and analysis capability allows the analysts to ask on-demand questions and what-if scenarios. For example, through these evaluations, Mean Time Between Failures (MTBF) are updated from their predicted values to reflect a component's true performance of parts. This metric is then used to drive forecasting allowing OEM and customers to optimize inventory and plan spares requirements.

Maintenance Support Services

IVHMS/Avionics Diagnostics Ground-based Integration

The Integrated Vehicle Health Management System (IVHMS) continuously monitors a number of permanently installed sensors to compute exceedances (high condition indicators that exceed normal conditions), and flight regimes in real time, and records the raw measurements from the sensors and computed data as described above with regard to a HUMS. It should be understood that the IVHMS data may include HUMS data as well as other or different data but is not limited to only such data. That is, any recorded raw measurements and computed data recorded on-board the aircraft is encompassed herein. The recorded raw measurements and computed data are downloaded post-flight to a mobile ground station (MGS) via, e.g., an aircraft removable storage device (such as a PCMCIA card) for subsequent processing/analysis. Processing the data at the mobile ground station (MGS) produces an Activity Data File (ADF) for parameter viewing, generation of trend plots, as well as pilot debrief and maintenance sessions.

Avionics Built-in Test (BIT) data is also typically provided by the Integrated Vehicle Health Management System (IVHMS). This Built-in Test (BIT) data includes available test results for system-level test, Line Replaceable Unit (LRU) level tests, Shop Replaceable Unit (SRU) Level 1 tests, data bus tests, and continuous Built-in Test (BIT) tests. The test data may be downloaded via an Ethernet connection to confirm maintenance corrective actions with the IETM. SRU/LRU status is also recorded/routed for down stream logistics supportability and supply chain management processing.

While current instrumentation techniques provide failure detection, often the true cause of an anomalous condition cannot be determined. To augment fault detection and isolation, the Integrated Support System (ISS) incorporates on-board observations and Integrated Vehicle Health Management System (IVHMS) data into a higher order reasoning system that drives flight-line maintenance actions via the Interactive Electronic Technical Manual (IETM). The Integrated Support System (ISS) provides interpretive analysis from various on-board systems and other data originators by inferencing possible causes in response to this data. That is, the Integrated Support System (ISS) includes an inferencing model which is matched to bitcode and other on-board system data from the Integrated Vehicle Health Management System (IVHMS) to associate or order suspect components or systems that may require replacement or maintenance. Since the Integrated Vehicle Health Management System (IVHMS) determines system/subsystem health and reports/stores status and fault data, the Integrated Support System (ISS) leverages this information to reduce a given exceedance's suspect set of components and provides an optimal troubleshooting start-point for the maintainer. That is, usage of the Integrated Support System (ISS) results in less time troubleshooting because the maintainer need acknowledge fewer prompts and thereby process less information.

Interpretative analysis of the Integrated Vehicle Health Management System (IVHMS) collected data reduces operation and support costs, improves flight safety, and increases aircraft readiness. This Integrated Support System (ISS) provided health and usage monitoring on an individual-aircraft basis also enables transition from a time-based to a condition-based maintenance philosophy.

Pilot Debrief Module (PDM)

The Pilot Debrief Module (PDM) is a browser-based application that allows aircrew to report symptoms or anomalies observed during flight or to provide additional information on any recorded Integrated Vehicle Health Management System (IVHMS) or Built-in Test (BIT) exceedance.

The Pilot Debrief Module (PDM) maintains a history of all the questions asked and the responses entered during the Pilot Debrief Module (PDM) session, provides a list of suspect components that cause the failure symptom, and provides appropriate follow-on instruction (i.e. create work order, replace component etc). An interface between the Pilot Debrief Module (PDM) and a maintenance management system (such as IMDS) stores the pilot debrief session for subsequent use by maintenance personnel performing troubleshooting. A symptom search capability that uses key words or phrases to search for pilot-observed failure symptoms, presents the failure symptom description, and dynamically presents questions relative to the failure symptom is also included in the Pilot Debrief Module (PDM).

IETM Ground-based Diagnostics Integration

To provide aircraft maintainers with the capability to perform dynamic and adaptive fault diagnosis, the ground-based diagnostics system is coupled with the Interactive Electronic Technical Manual (IETM). The ground-based diagnostics system is designed for use on a MGS and contains an "inference engine" which operates on the knowledge base to assist the maintainer in troubleshooting. This fulfills at least the following objectives:

Reduces false removals by providing expedient ground-based testing and decision assistant that encourage maintainers to perform systematic troubleshooting instead of the uneconomical approach of essentially random preemptive part replacement; and Reduces the maintainer's dependency on training, experience, and expertise by providing a knowledge-based decision assistant that incorporates documented technical data, on-going fleet maintenance experience, and optimized dependency-modeled input.

The ground-based diagnostics system adapts to the current condition of the aircraft and finds alternate paths if a critical piece of test equipment is not available. Information from many sources is utilized to develop the knowledge base. These sources may, for example, include: technical manual decision trees, engineering data, Failure Effects Maintainability Criticality Analysis (FEMCA) data, Reliability and Maintainability (R&M) data, Reliability Centered Maintenance (RCM) data, historical data, and fleet maintenance experience.

A modeling environment allows the modeling author to specify cause-effect dependencies using a hierarchical, multi-layered (multi-signal), directed-graph representation of the system. The author enters a complete and systematic description of the system under analysis for each of the system's assemblies, sub-assemblies, components, and includes failure sources of the components that comprise that system. For each component, the following may be provided: Mean Time To Repair (MTTR); repair cost; rectification cost; description of the component; and a reference to a repair procedure in the Interactive Electronic Technical Manual (IETM). Anticipated faults, failure symptoms produced by the fault, and tests that would detect the faults may also be provided.

The system modeling environment facilitates production of a matrix in which one dimension of the matrix may define the relationships between symptoms and faults and another dimension may define the relationships between faults and tests that detect these faults. Each test carries a "cost" based on a number of factors, such as accessibility, difficulty in performing a test, and risk. The test costs facilitate ground-based diagnostics system calculation of the test utility and/or efficiency. The result of the matrices, along with the failure rates and test costs, is an optimized "tree" of possible symptom/test/repair paths.

The system model may be encoded in Extensible Markup Language (XML) documents which are stored in a knowledge base and are accessed during "run-time". The run-time component of the ground-based diagnostics system is integrated into IETM.

Each failure symptom in the advanced ground-based diagnostics system session is supported by a simplified schematic (FIG. 11) developed to show the wiring and components associated with the particular failure symptom. Access is also provided to the full system "intelligent" schematic, and hyperlinked locator diagrams. All of these features provide the Interactive Electronic Technical Manual (IETM) with Class V IETM functionality.

Interactive Electronic Technical Manual (IETM) Software

Figure 3:
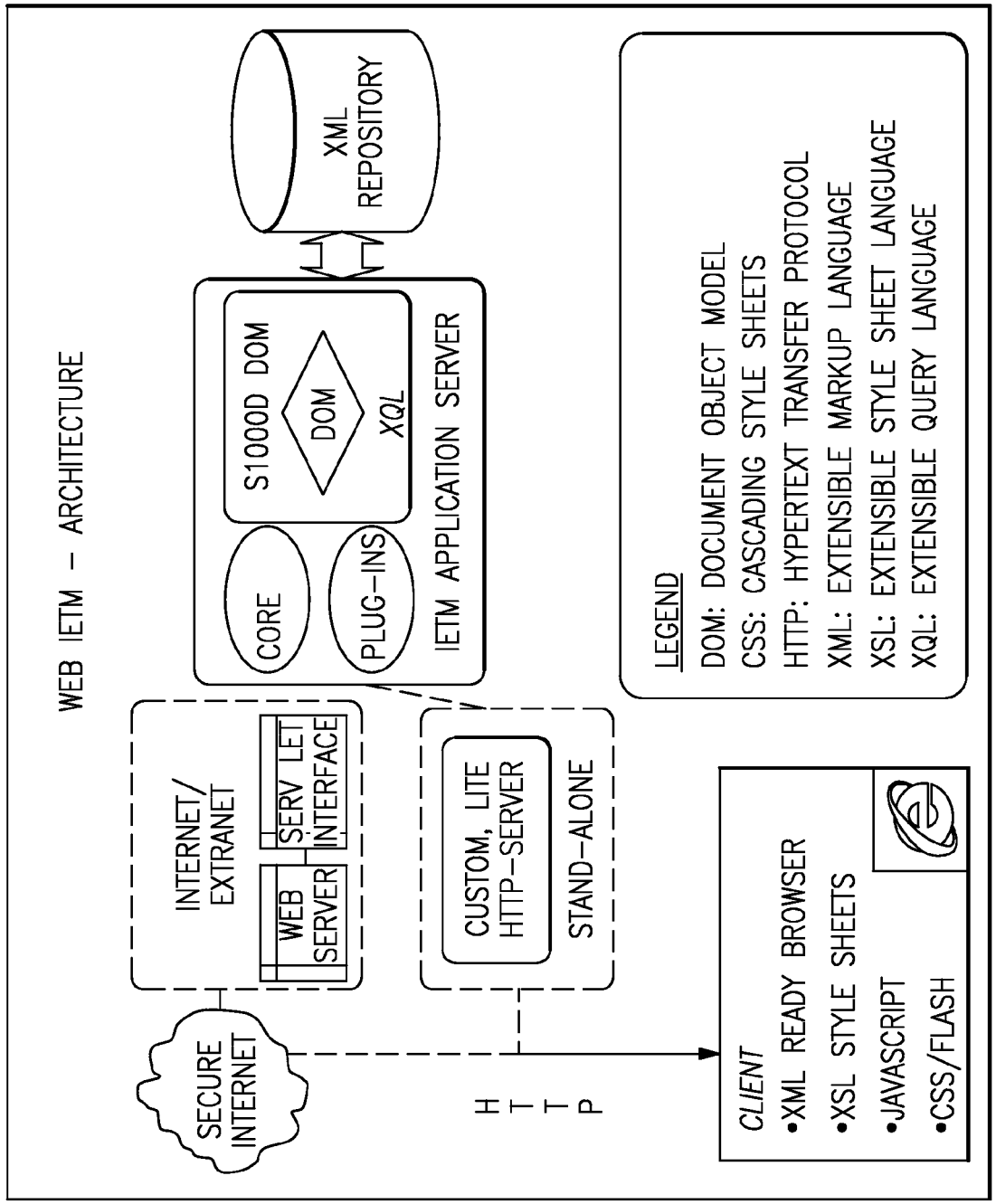
FIG. 3 is a schematic block diagram of an Interactive Electronic Technical Manual (IETM) architecture.

Interactive Electronic Technical Manual (IETM) is a portable electronic "library" that stores thousands of pages of documentation and is used to locate required information (text and illustrations) more rapidly than with a paper technical manual. The Interactive Electronic Technical Manual (IETM) may be a W3C Consortium compliant, server-side thin client, open architecture non-proprietary product that leverages new and emerging Internet technologies such as XML, XSL (eXtensible Style Sheet Language), XQL (eXtensible Query Language), Java, Java script, Microsoft Internet Explorer Browser with Flash multimedia, and ActiveX CGM Viewer (FIG. 3).

The Interactive Electronic Technical Manual (IETM) features a complete hyper-linked table of contents, detailed search capabilities, and hyperlinks to referenced text and illustrations from within theory of operation descriptions, maintenance operational checks, fault isolation procedures, component repair procedures, and replacement parts.

The Interactive Electronic Technical Manual (IETM) dynamically generates electronic work cards for schedule maintenance and inspection tasks, displays animations and 3-D interactive graphics for just-in-time training supplementation, integrates with the aircraft IVHMS, avionics, and advanced ground-based diagnostics data for troubleshooting, and interfaces directly to the parts/supply system for inventory checking and parts ordering.

The Interactive Electronic Technical Manual (IETM) identifies the setup and test operations along with multimedia content to be presented at each maintenance step. Maintainers enter/select a key word or phase to describe a reported or detected failure symptom. The Interactive Electronic Technical Manual (IETM) allows the maintainer to retrace or bypass completed steps ("Undo" and "Cannot Do" functionality) in a troubleshooting session, change the test results, and take an alternative branch in the troubleshooting strategy. The Interactive Electronic Technical Manual (IETM) uses this information to invoke the ground-based diagnostics system which recommends tests that are based upon the optimized diagnostic tree that was constructed in the model development environment. Run-time troubleshooting is "dynamic," continually adjusting the test strategy based upon available resources, tests performed, and the state of the aircraft. The Interactive Electronic Technical Manual (IETM) keeps track of setup operations already performed and presents post-setups when appropriate.

The Interactive Electronic Technical Manual (IETM) may be used directly from a CD-ROM/DVD and accessed directly from a local computer hard drive (including a hand-held palm pilot-type device), or distributed as a web application over a secure network website.

Figure 4:
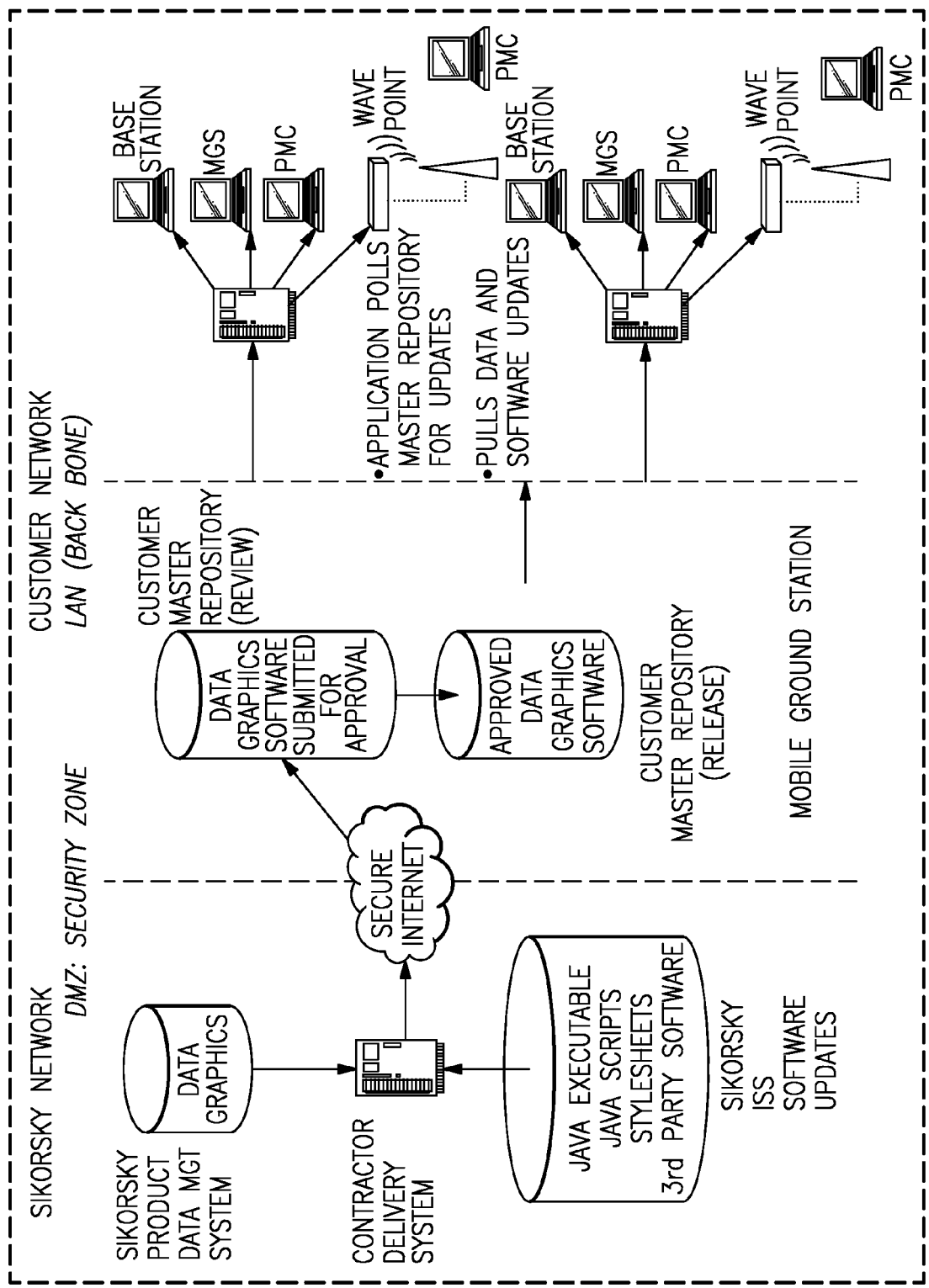
FIG. 4 is a schematic block diagram of the data, graphics, and software update process.

Updates to the Interactive Electronic Technical Manual (IETM) data, graphics and software may be made separately via CD/DVD or over a network website (FIG. 4). There are at least two scenarios for providing updates over a secure website. The first is to host the Integrated Support System (ISS) services at the OEM. The latest approved updates are maintained and posted to the OEM-hosted server and are available real-time to OEM customers. In the second scenario, the OEM-approved updates are provided to the customer and the customer posts the updates to their master server for access over their intranet. Servers at various customer locations then poll the master server for updates and subsequently pull all recently approved/released updates as required. The Integrated Support System (ISS) base stations, mobile ground stations (MGS), Portable Maintenance Computer (PMCs), and Unique Identifier (UID) readers access the latest updates when connected to the network.

Plug Locator Application (PLA)

The Plug Locator Application (PLA) allows the user to enter termination points such as plugs and jacks by reference designator, part number or nomenclature and subsequently view the termination point location plotted on the aircraft by station, waterline, and butt line. Additionally, the Plug Locator Application (PLA) allows users to enter an access panel by number or nomenclature and subsequently view the access panel location plotted on the aircraft by station, waterline, and butt line or view its associated work zone.

Web-based Training (WBT) Interface

For just-in-time context-sensitive access to training lessons, a user may select a link from within the Interactive Electronic Technical Manual (IETM) that launches the Web-based Training (WBT) application. The Web-based Training (WBT) opens in a separate web browser and displays an Interactive Multimedia Instruction (IMI). Additionally the Web-based Training (WBT) provides a link to the most relevant technical manual content in the Interactive Electronic Technical Manual (IETM). Multimedia is shared between the Interactive Electronic Technical Manual (IETM) and WBT applications.

Integrated Support System (ISS) Concept Of Operations

The Integrated Support System (ISS) integrates the entire maintenance and support environment and bind the information flow among the various aircraft and logistics networks.

Aircraft Data Collection and Download

An Integrated Vehicle Health Management System (IVHMS) and a Portable Maintenance Computer (PMC) are employed to gather Integrated Vehicle Health Management System (IVHMS) and built-in test (BIT) data. The Integrated Vehicle Health Management System (IVHMS) utilizes strategically placed sensors located on flight critical components such as transmissions, rotors, and engines. These sensors are continually monitored for predetermined exceedance values. In addition, the Portable Maintenance Computer (PMC) initiates and stores the results of many built-in tests. The Integrated Vehicle Health Management System (IVHMS) and Portable Maintenance Computer (PMC) data along with aircraft flight time and landings information is recorded, stored, and downloaded to the mobile ground station (MGS) via a PCMCIA card at post-flight on the ground.

The Integrated Vehicle Health Management System (IVHMS) and BIT data into test pass/fail results, processes the test result data to compute the health status of all system components, and stores the test result data for subsequent use. Aircraft hours and landings data is also communicated therewith to the maintenance management system (IMDS) for maintenance projections and to the fleet monitoring control center for display.

Fleet Monitoring Control Center

Figure 5:
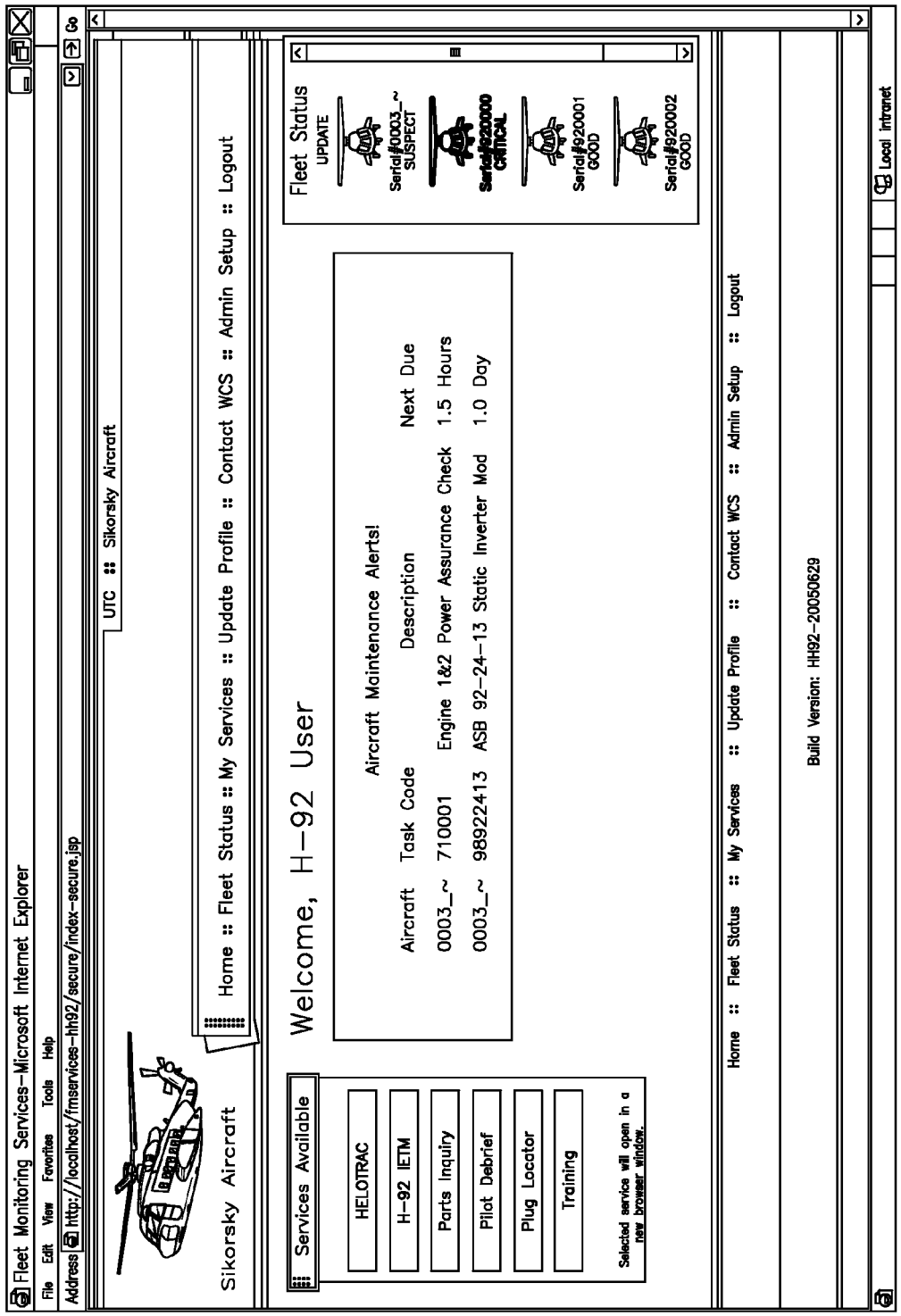
FIG. 5 is a screenshot of a fleet monitoring control center.

The Fleet Monitoring Control Center is accessible via a secure network connection at the base station and mobile ground station (MGS) by upper echelon management, maintenance control, QA shop, or various work centers (FIG. 5). All data collected at the mobile ground station (MGS) may be passed to the base station via a secure Internet connection. This is desirable to ensure all users accessing the base station for status are presented with near real-time status of every aircraft in the fleet. This update is accomplished automatically or manually as decided by the OEM/customer team.

The "Services Available" portion of the control center provides links to additional services available to include the Interactive Electronic Technical Manual (IETM), parts inquiry, pilot debrief, plug locator and training. The "Alerts" portion of the control center identifies the scheduled maintenance actions required within the next few days. The "Fleet Status" portion of the control center provides a color-coded representation of each aircraft's status in the fleet.

Figure 6:
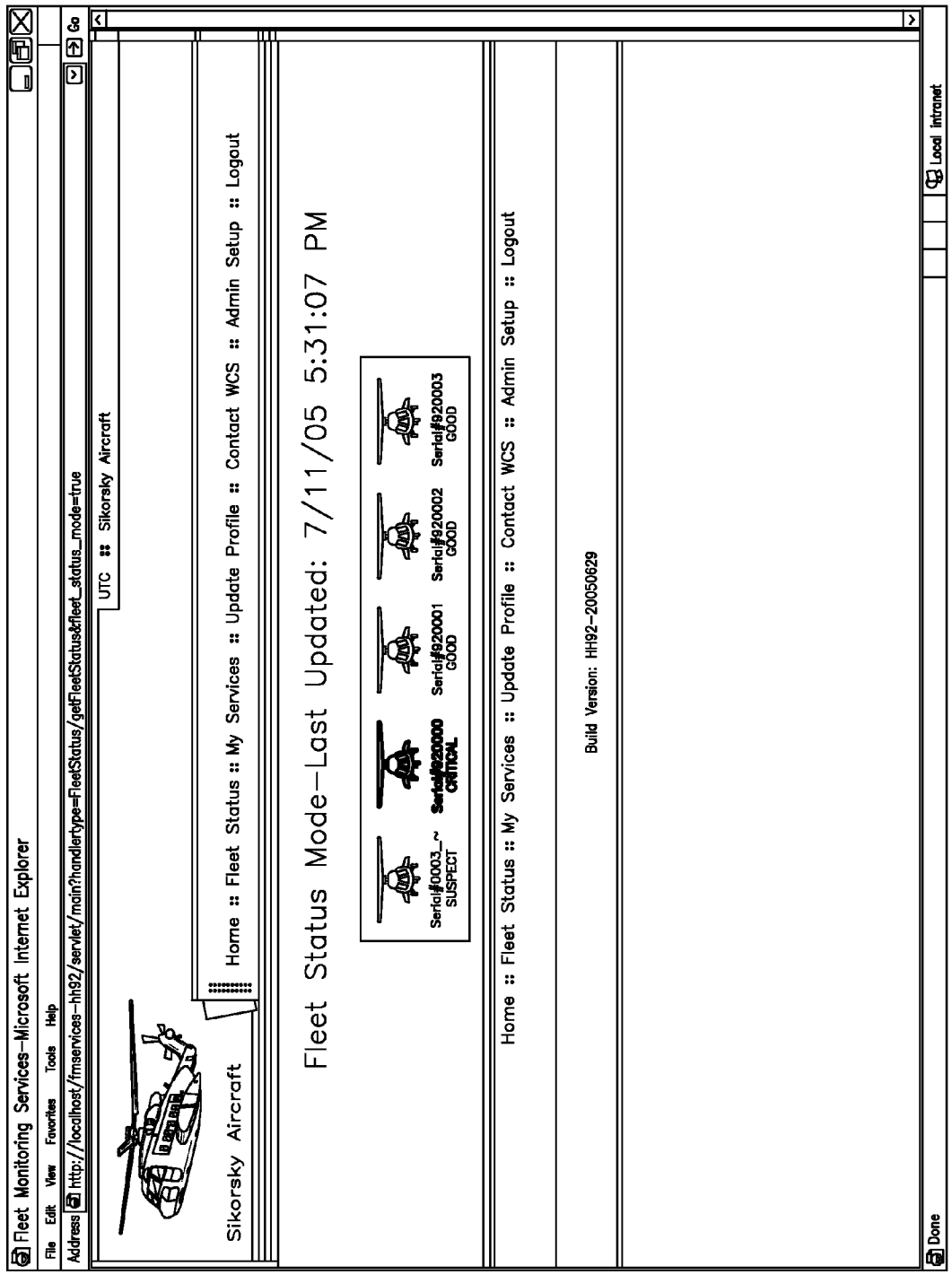
FIG. 6 is a screenshot of a fleet status update.

The "Fleet Status Functionality" provides a single view of the entire fleet's status (FIG. 6). A green aircraft indicates that the specific aircraft is mission ready. A yellow aircraft indicates that the specific aircraft has at least one discrepancy, however the discrepancies are not severe enough to compromise the aircraft's mission readiness. A red aircraft indicates that the specific aircraft has a discrepancy severe enough to be not mission capable.

An aircraft icon turns red to indicate that an exceedance was detected. The display may be updated regularly, for example, every 10 seconds. By selecting the red aircraft the user has access to the aircraft symptom summary. The summary displays the last updated aircraft landing hours, detected symptoms (or exceedances), and outstanding squawks. In addition, the system provides work order status (not created, initialized, complete).

Suspect Component Screen

Figure 7:
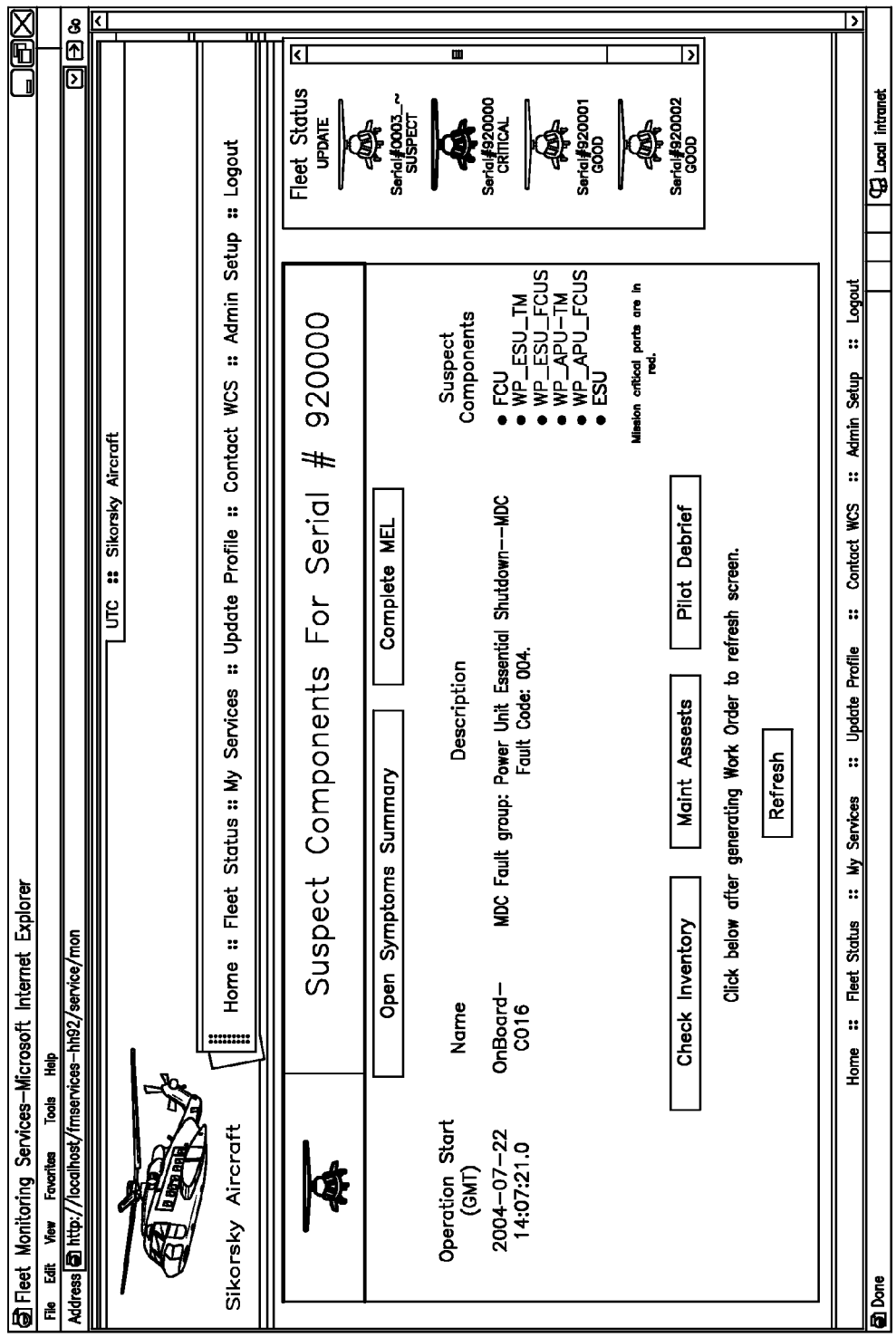
FIG. 7 is a screenshot of a suspect component example for aircraft serial no. 920000.

Selecting the mobile ground station (MGS) red aircraft provides access to the Fleet Management Suspect Components screen (FIG. 7). The Suspect Components screen displays the fault description and the suspect list of components that would cause the failure as determined by the dependency model. The components listed in red are the components that cause the aircraft to be not mission capable. Additional support tools such as "Check Inventory", "Maint Assets", and "Pilot Debrief" buttons are also accessible from the suspect component screen. The "Check Inventory" function provides access to the supply system and displays part number, description, condition and quantity on hand information (FIG. 8). The "Maint Assets" function provides a list of special materials, tools, or support equipment required to perform the maintenance tasks associated with the suspect components. This information can be printed or e-mailed to supply for pre-positioning of assets prior to the start of maintenance.

Pilot Debrief Session

Figure 9:
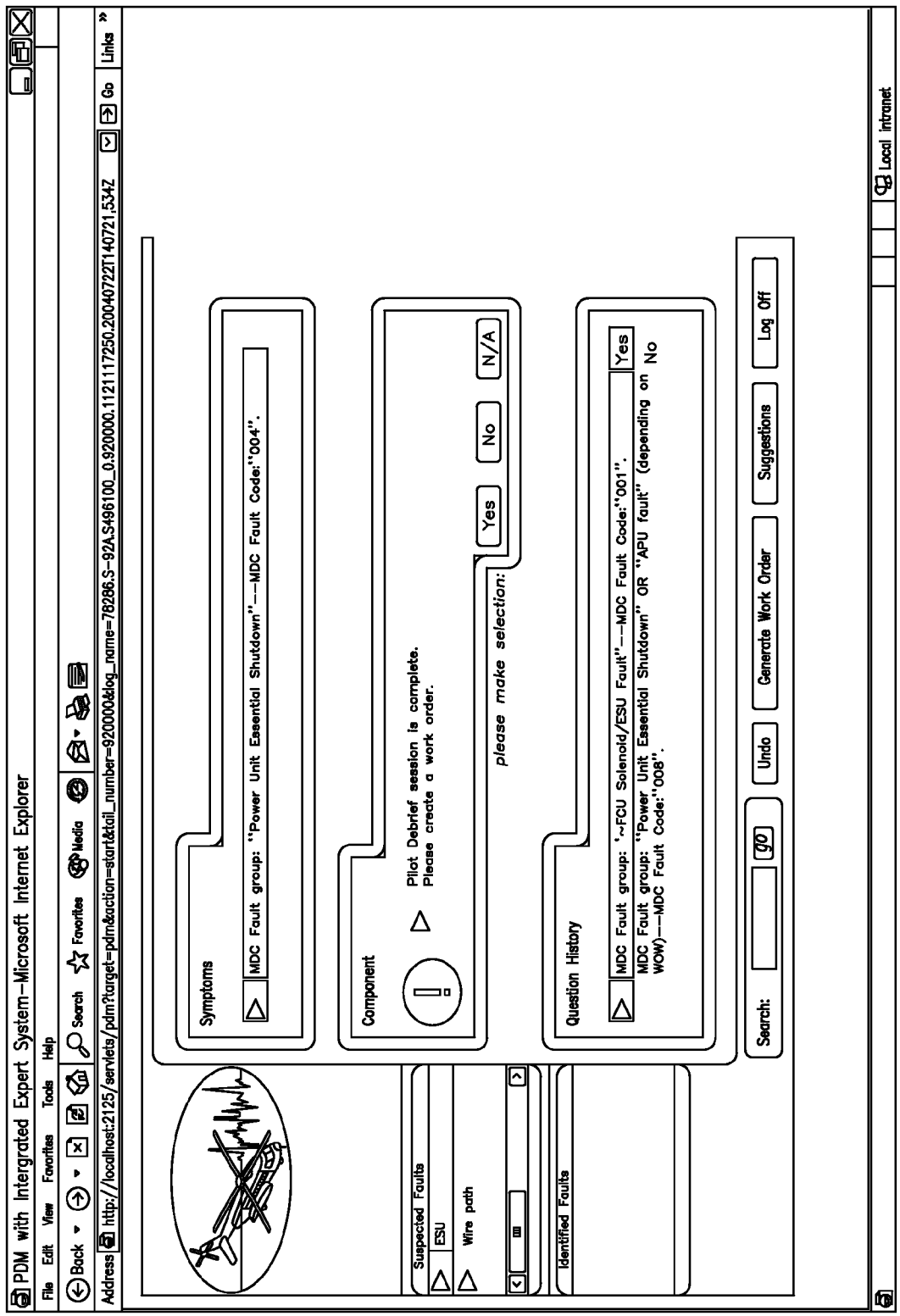
FIG. 9 is a screenshot of a pilot debrief module of the Integrated Support System (ISS)

A Pilot Debrief session (FIG. 9) is available to solicit additional information from the aircrew. By capturing this information it is possible to reduce the suspect component list and thereby reduce troubleshooting time. The "Pilot Debrief" application is launched by the aircrew, whereupon the crewmember would securely login then specify the aircraft and flight to set the context for the debrief session.

For cases where on-board exceedances were recorded, a dynamically generated sequence of questions that are relevant to the on-board exceedances is displayed to the crewmember. In case there are no exceedances for the specified flight, the crewmember can search from a list of symptoms to start the debrief session. Based on the selected symptom, the crewmember is prompted to answer a dynamic questionnaire related to observations; the response to each question determines the next question asked.

If the diagnosis at the end of "pilot debrief" suggests a maintenance action (one or more system components have a Suspect or Bad health status), the "pilot debrief" module initiates the generation of a work order in the maintenance management system. The information from the Integrated Vehicle Health Management System (IVHMS) download are passed along with the work order request for later retrieval during troubleshooting. Once the data has been saved, a work order ID is generated and the "Fleet Management Suspect Component" screen is updated to reflect the reduced number of suspected components as well as changing the work order status from "Not Created" to "Initialized".

The maintenance management system provides an interface for the maintenance organization's maintenance personnel to review the maintenance actions initiated as a result of the Pilot Debrief session, schedule the maintenance action, and assign resources (i.e., maintainers) to the jobs.

IETM Session

Figure 11:
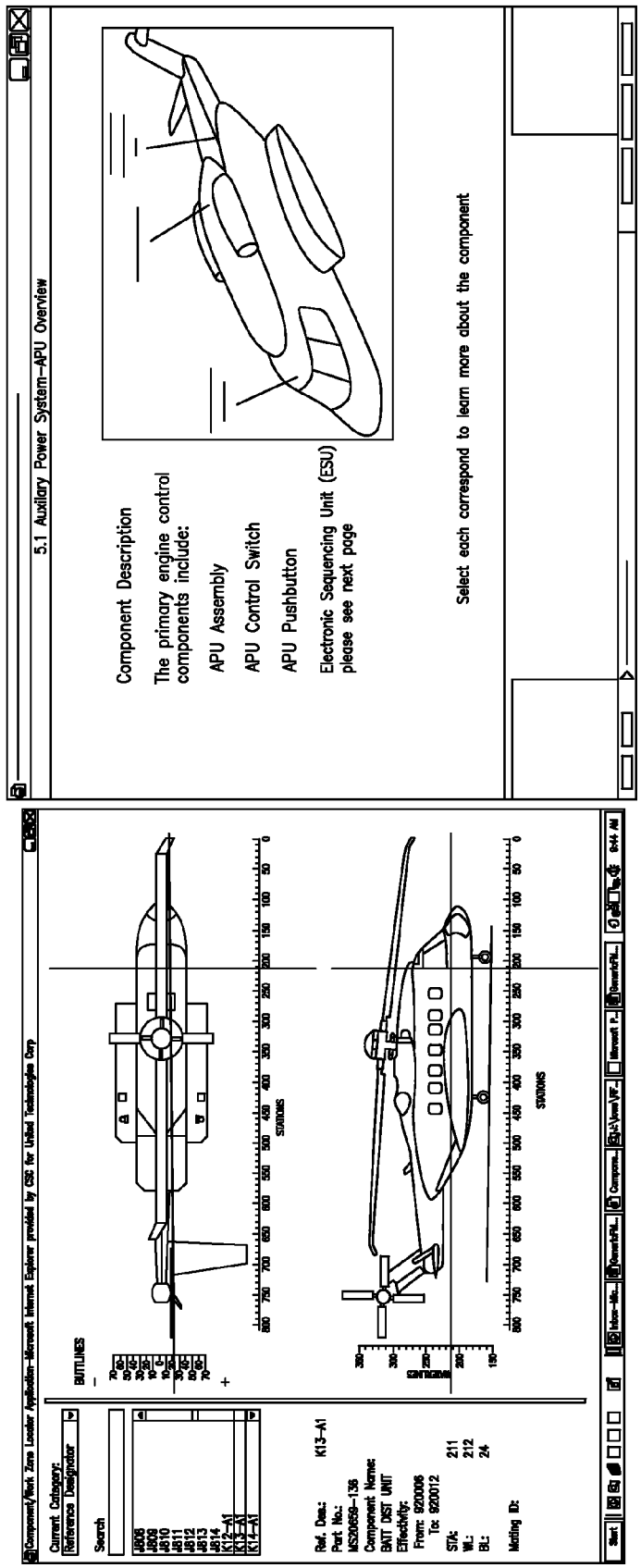
FIG. 11 is a screenshot of a plug locator/web based training page of the Integrated Support System (ISS)

The maintainer may connect a Portable Maintenance Computer (PMC) to the network and securely login. Information download includes the work order, associated ground-based diagnostics, pilot debrief session data, and aircraft configuration information. Once at the aircraft with the pre-positioned parts, the maintainer uses the Portable Maintenance Computer (PMC) to access the Interactive Electronic Technical Manual (IETM) (FIG. 10). The Interactive Electronic Technical Manual (IETM) contains theory, troubleshooting, maintenance procedures, and parts data as well as links to the web-based training and the plug locator application (FIG. 11).

By leveraging the information collected from the Integrated Vehicle Health Management System (IVHMS) download and the pilot debrief, the maintainer begins troubleshooting at the most optimal point—checking and troubleshooting only those components associated with the recorded failure.

The maintenance session is initiated by selecting the Interactive Electronic Technical Manual (IETM) Expert System Resume from Debrief. The maintainer is presented with a list of resources which when selected as available or unavailable dynamically alters the troubleshooting strategy. The Interactive Electronic Technical Manual (IETM) with embedded ground-based diagnostics guides the maintainer through the troubleshooting process by prompting a sequence of setup operations, tests, associated multimedia, and eventual maintenance repair action which may include the recommendation to replace a component.

Parts Ordering

If parts were not pre-positioned and the maintainer had access to the Internet/network, parts availability can be checked in the supply system and a parts requisition list can be developed. To do this, the maintainer selects the Interactive Electronic Technical Manual (IETM) parts tab. When the part number is not known, the parts information can be located visually on the artwork by index numbers. An index search feature is also provided to display the associated part information.

Figure 12:
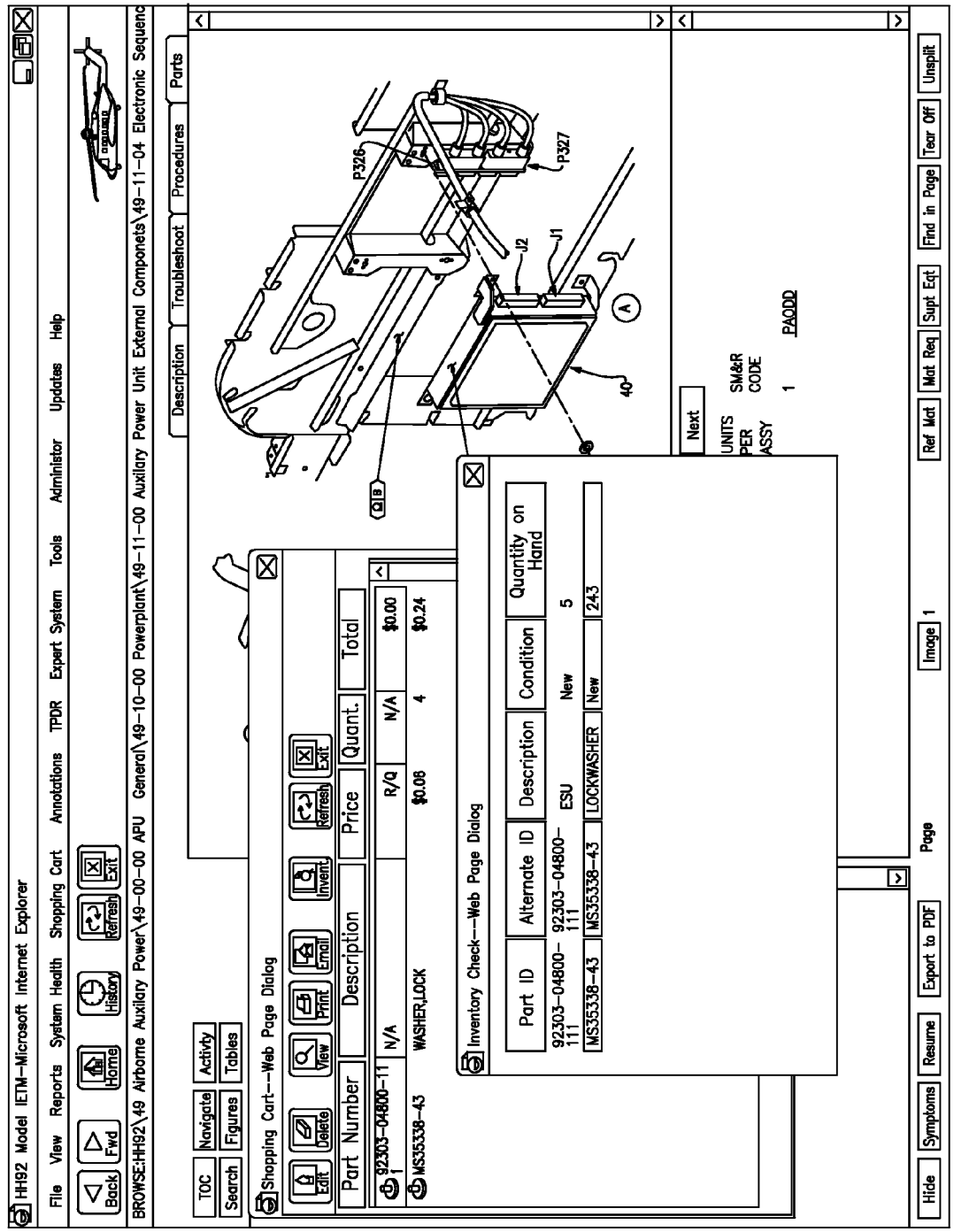
FIG. 12 is a screenshot of a parts ordering module of the Integrated Support System (ISS)

Selecting the part number adds the item to the requisition list—called a "shopping cart" (FIG. 12). Quantity and notes can be specified for each item. Each item's availability in supply is checked in real time. The requisition form is autopopulated and can be viewed, edited, saved, emailed or with a network connection, communicated directly to supply. Order status may also be checked and shipments tracked.

As part of on going business operations, periodic checks and balances of qualified suppliers are made by the OEM. Within the life cycle database is information regarding lead time, sources of supply, proprietary rights, indication with regard to time frame of design and other pertinent information. Items are ranked and evaluated for inclusion regarding potential problems. In the event that a potential problem moves closer to becoming a real problem, advance notification is made regarding the problem, alternatives with cost and conclusions/recommendations for action and resolution.

Capturing Parts Unique Identification (UID)

Figure 13:
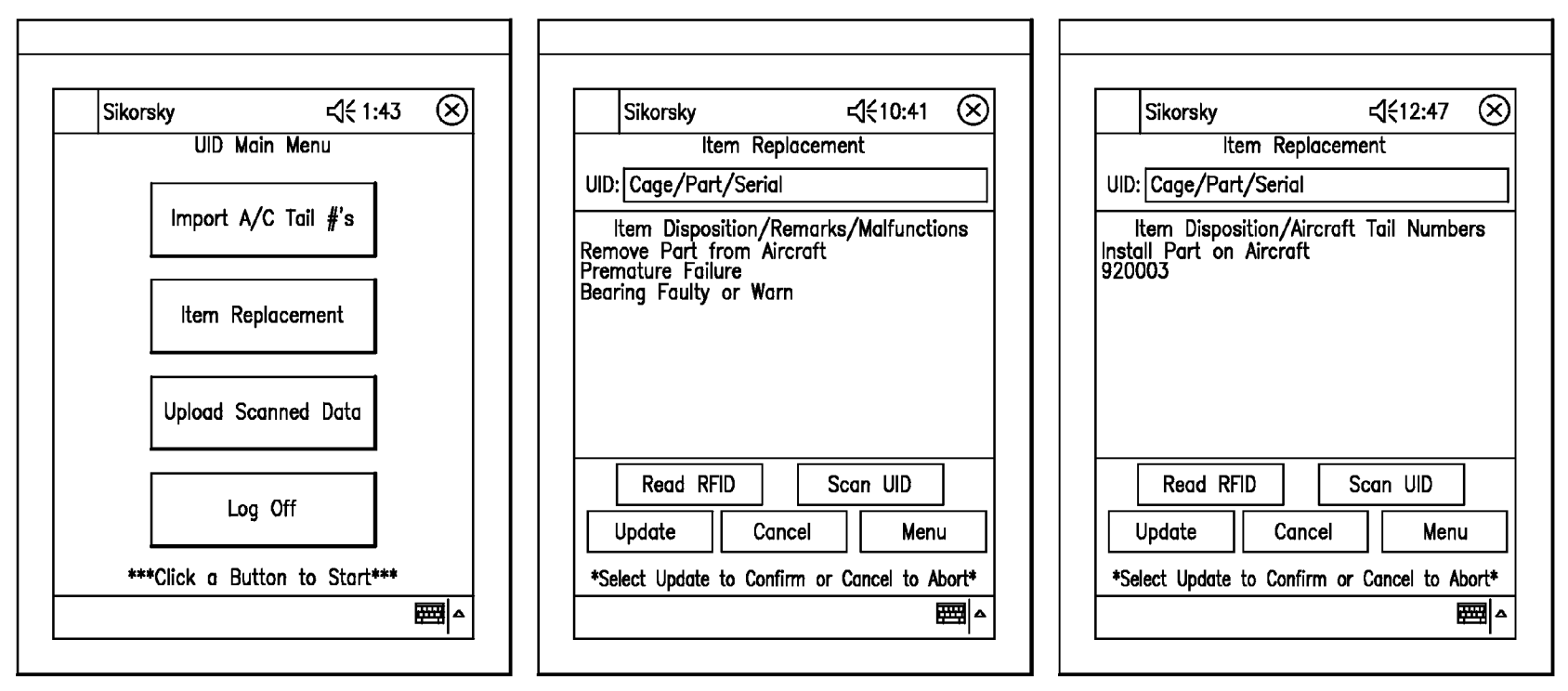

Prior to the maintenance session, the UID reader is connected to the Portable Maintenance Computer (PMC) via the docking station to import aircraft tail numbers to the UID. When the maintainer removes a faulty part from the selected aircraft (part-off) the maintainer is prompted to select an associated remarks code and malfunction code. Next, the part for installation (part-on) is scanned and the maintainer is prompted to select the aircraft the part is being installed on. Both part-off and part-on information is stored for upload to the Portable Maintenance Computer (PMC) for future update of the Maintenance Management System (MMS) (FIG. 13). Once the data is uploaded to the Portable Maintenance Computer (PMC), the local maintenance management system (Helotrac Lite) is updated to temporarily store part on/off data until an Internet connection is available for updating the MMS.

Closing Out the Work Order

After all maintenance work has been completed at the aircraft and the associated data captured, the maintainer is provided with the capability to transfer the collected information from the Portable Maintenance Computer (PMC) to the mobile ground station (MGS).

With the data loaded from the Portable Maintenance Computer (PMC) to the mobile ground station (MGS), the next step is to close out the work order. This is also done at the mobile ground station (MGS) "Suspect Components" screen. Selecting the "Close Work Order" button and "Refresh" button updates the aircraft from red to yellow or green. The information collected at the mobile ground station (MGS) is then communicated to the base station to reconcile and update the fleet status. Over time, the collected data updates executive-level reports for access from the base station or other higher level system.

Figure 14:
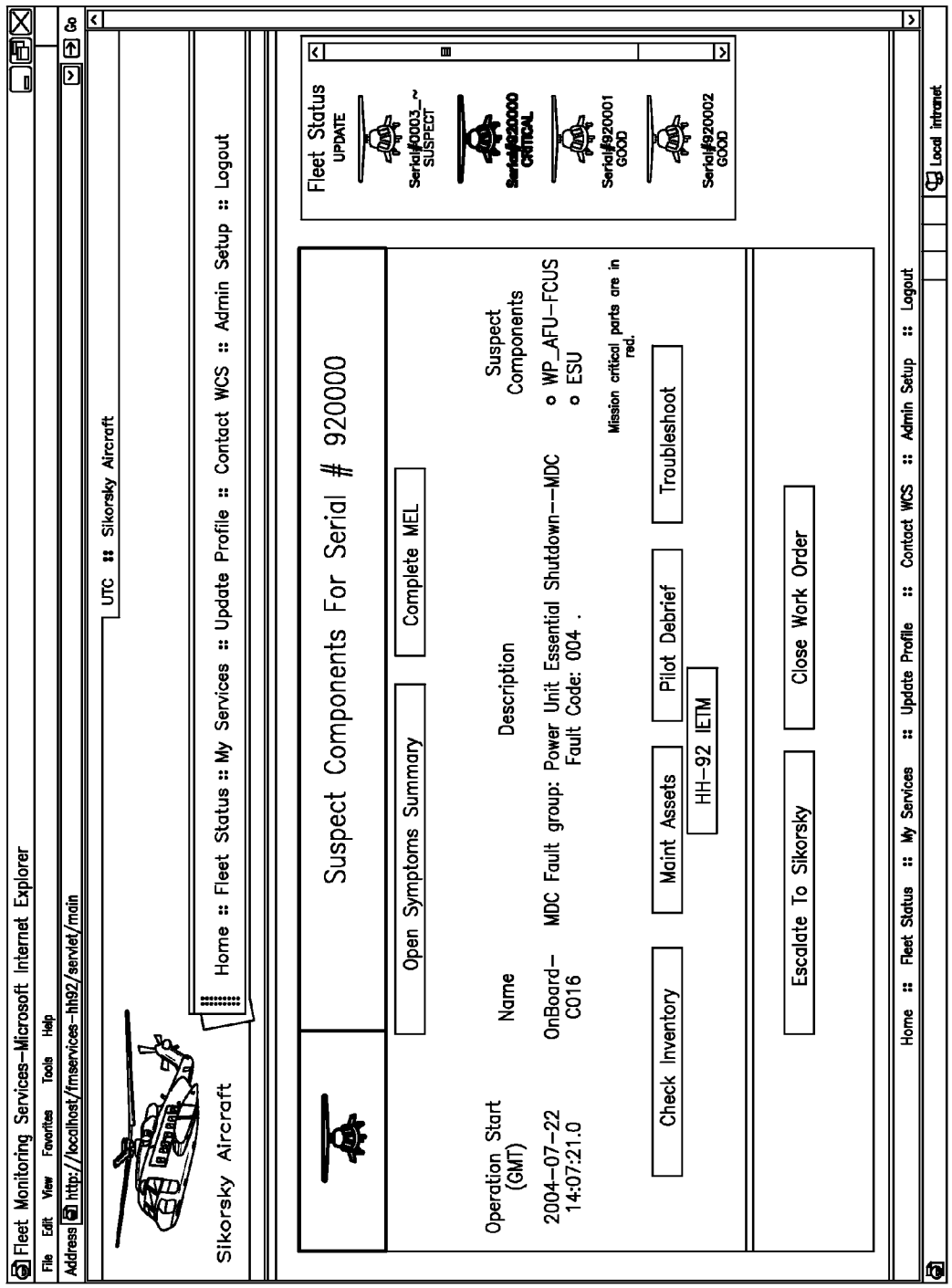
FIG. 14 is a screenshot of an escalate to OEM portal/close work order function of the Integrated Support System (ISS).

If the suggested maintenance did not correct the reported failure, the Integrated Support System (ISS) sends all pertinent data captured during the maintenance session to the OEM for appropriate investigation, resolution, and storage in knowledge base. This capability is provided by an Escalate to Sikorsky button located on the mobile ground station (MGS) "Suspect Components" screen (FIG. 14). This feed back mechanism between the customer and the OEM is provided to ensure the actual maintenance actions performed to resolve the discrepancy is captured and used to update the troubleshooting and/or maintenance procedures in subsequent updates.

Although particular step sequences are shown, described, and claimed, it should be understood that steps may be performed in any order, separated or combined unless otherwise indicated and will still benefit from the present invention.

The foregoing description is exemplary rather than defined by the limitations within. Many modifications and variations of the present invention are possible in light of the above teachings. The preferred embodiments of this invention have been disclosed, however, one of ordinary skill in the art would recognize that certain modifications would come within the scope of this invention. It is, therefore, to be understood that within the scope of the appended claims, the invention may be practiced otherwise than as specifically described. For that reason the following claims should be studied to determine the true scope and content of this invention.

What is claimed:

1. An Integrated Support System for Aircraft Fleet Management comprising:
   a system operable to receive data downloaded from an aircraft, process said data to infer a status of at least one aircraft system and display maintenance information relative to the status via an Interactive Electronic Technical Manual (IETM) which displays an availability of a part identified in the IETM in a supply chain.

2. The system as recited in claim 1, wherein said system includes a base station in communication with at least one mobile ground station.

3. The system as recited in claim 2, wherein said at least one mobile ground station is in communication with at least one Portable Maintenance Computer (PMC) having a local maintenance management system installed thereon.

4. The system as recited in claim 2, wherein said at least one mobile ground station is in communication with a Unique Identifier (UID) Reader.

5. The system as recited in claim 4, wherein said UID Reader is configured to read a part marking technology.

6. The system as recited in claim 2, wherein said base station includes a Maintenance Management System (MMS).

7. The system as recited in claim 2, wherein said at least one mobile ground station is in communication with at least one Portable Maintenance Computer (PMC) having a local maintenance management system installed thereon said local Maintenance Management System operable to selectively communicate with a Maintenance Management System (MMS) installed on said base station.

8. The system as recited in claim 7, wherein said MMS is operable to generate a work order from a pilot debrief module.

9. The system as recited in claim 7, wherein said MMS is operable to generate aircraft configuration update work orders.

10. The system as recited in claim 1, wherein the part identified in the IETM in the supply chain is related to an aircraft tail number of the aircraft on which the part is being installed.

11. The system as recited in claim 1, wherein the part identified in the IETM in the supply chain is related to an aircraft tail number of the aircraft from which the part is being removed.

12. The system as recited in claim 1, further comprising:
   a base station;
   a mobile ground station in communication with said base station; and
   a Unique Identifier (UID) Reader in communication with said mobile ground station, said UID Reader configured to read a part marking technology.

13. The system as recited in claim 12, wherein said mobile ground station is in communication with at least one Portable Maintenance Computer (PMC) having a local maintenance management system installed thereon, said local Maintenance Management System operable to selectively communicate with a Maintenance Management System (MMS) installed on said base station.

14. The system as recited in claim 1, further comprising:
   a base station;
   a mobile ground station in communication with said base station; and
   a Portable Maintenance Computer (PMC) in communication with said mobile ground station, said PMC having a local maintenance management system installed thereon, said local Maintenance Management System operable to selectively communicate with a Maintenance Management System (MMS) installed on said base station.

15. The system as recited in claim 14, further comprising a Unique Identifier (UID) Reader in communication with said mobile ground station, said UID Reader configured to read a part marking technology.

16. The system as recited in claim 1, wherein the part identified in the IETM in the supply chain is related to an aircraft tail number.

17. The system as recited in claim 1, wherein the part identified in the IETM in the supply chain is located pictorially on an aircraft diagram.

18. A computer-implemented Integrated Support System method comprising:
   processing data downloaded from an aircraft to infer a status of at least one aircraft system; and
   displaying maintenance information relative to the status via an Interactive Electronic Technical Manual (IETM) in response to said processing, said displaying further comprises:
   selecting a part in the IETM;
   adding the part to a requisition list; and
   displaying an availability of the part in a supply chain.

19. The method as recited in claim 18, further comprising:
   reporting symptoms observed during flight to a Pilot Debrief Module (PDM); and
   processing the symptoms with the downloaded data to infer the status.

20. The method as recited in claim 19, wherein said processing further comprises:
   matching the downloaded data and the symptoms using an inferencing model to order suspect systems.

21. The method as recited in claim 18, wherein said selection further comprises:
   locating the part pictorially on an aircraft diagram.

22. A computer-implemented Integrated Support System method comprising:
   processing data downloaded from an aircraft to infer a status of at least one aircraft system; and
   displaying maintenance information relative to the status via an Interactive Electronic Technical Manual (IETM) in response to said processing, said displaying further comprises:
   scanning a part removed from the aircraft;
   selecting an associated remarks code and a malfunction code for the part;
   scanning a replacement part to be installed on the aircraft; and entering an aircraft tail number of the aircraft on which the part is being installed.

23. The method as recited in claim 22, wherein said displaying further comprises:
scanning a replacement part to be installed on the aircraft; and
entering an aircraft tail number of the aircraft on which the part is being installed.

24. A computer-implemented Integrated Support System method comprising:
downloading Integrated Vehicle Health Management System (IVHMS) data and BIT data from an aircraft;
converting the data into pass/fail test result data;
processing the test result data to compute a health status of at least one aircraft system, said processing further comprises:
processing test result data of system-level tests;
processing test result data of Line Replaceable Unit (LRU) level tests;
processing test result data of Shop Replaceable Unit (SRU) level tests; and
processing test result data of data bus tests; and
displaying maintenance information relative to the health status via an Interactive Electronic Technical Manual (IETM) in response to said processing.

25. The method as recited in claim 24, further comprising:
routing SRU/LRU status to a down stream logistics supportability and supply chain management processing system.

26. The method as recited in claim 24, further comprising:
recording part-off and part-on information with a Unique Identifier (UID) Reader during aircraft maintenance performed at the aircraft.

27. The method as recited in claim 24, wherein said downloading further comprises:
downloading health usage and monitoring data.

* * * * *